US008920932B2

(12) United States Patent
Adam

(10) Patent No.: US 8,920,932 B2
(45) Date of Patent: Dec. 30, 2014

(54) RECYCLING CARBON FIBERS FROM EPOXY USING SOLVENT CRACKING

(75) Inventor: Georgius Abidal Adam, Edensor Park (AU)

(73) Assignee: Empire Technology Development LLC, Wilmington, DE (US)

(*) Notice: Subject to any disclaimer, the term of this patent is extended or adjusted under 35 U.S.C. 154(b) by 44 days.

(21) Appl. No.: 13/814,844

(22) PCT Filed: Jul. 19, 2012

(86) PCT No.: PCT/US2012/047276
§ 371 (c)(1),
(2), (4) Date: Feb. 7, 2013

(87) PCT Pub. No.: WO2014/014458
PCT Pub. Date: Jan. 23, 2014

(65) Prior Publication Data
US 2014/0023581 A1 Jan. 23, 2014

(51) Int. Cl.
*B32B 25/04* (2006.01)
*C01B 31/02* (2006.01)
*C08J 3/12* (2006.01)
*B29B 17/00* (2006.01)
*C08J 11/00* (2006.01)
*B29B 17/02* (2006.01)
*B32B 25/12* (2006.01)
*B29K 105/06* (2006.01)
*B29K 307/04* (2006.01)

(52) U.S. Cl.
CPC . *C01B 31/02* (2013.01); *C08J 3/12* (2013.01); *B29B 17/00* (2013.01); *C08J 11/00* (2013.01); *B29B 17/02* (2013.01); *B29K 2105/06* (2013.01); *B29K 2307/04* (2013.01); *B29B 2017/0293* (2013.01)
USPC ...................................... 428/493

(58) Field of Classification Search
USPC ...................................... 528/493
See application file for complete search history.

(56) References Cited

U.S. PATENT DOCUMENTS

| 5,316,224 | A | 5/1994 | Dobozy |
| 6,537,341 | B2 | 3/2003 | Dannenhauer et al. |
| 6,722,593 | B1 | 4/2004 | Dobozy |
| 7,497,394 | B2 | 3/2009 | Muther et al. |
| 7,829,566 | B2 | 11/2010 | Mederski et al. |
| 7,922,871 | B2 | 4/2011 | Price et al. |
| 2003/0149209 | A1 | 8/2003 | Inagaki et al. |
| 2005/0029487 | A1 | 2/2005 | Chiu et al. |
| 2006/0246391 | A1 | 11/2006 | Gaur et al. |
| 2010/0189629 | A1 | 7/2010 | Price et al. |
| 2010/0267868 | A1 | 10/2010 | Takahashi et al. |

FOREIGN PATENT DOCUMENTS

| DE | 2810043 | C2 | 7/1987 |
| DE | 102005001569 | A1 | 7/2006 |
| EP | 2152487 | B1 | 6/2011 |
| GB | 2477531 | A | 8/2011 |
| JP | 6099160 | A | 4/1994 |
| JP | 2001262158 | A | 9/2001 |
| JP | 2003190759 | A | 7/2003 |
| WO | WO 03/089212 | A1 | 10/2003 |

OTHER PUBLICATIONS

Indian Patent No. 226245 (Foreign Patent No. IN 785/del/1999)—application.*
International Search Report and Written Opinion for PCT/US2012/047276 dated Dec. 13, 2012.
ELG Carbon Fibre Ltd., Recycled Carbon Fibre, http://www.elgcf.com/about-recycled-carbon-fibre.html (Printed from Internet Feb. 6, 2013).
Favre et al., Initiation of cracks in carbon fibre reinforced plastics by organic liquids, *Journal of Materials Science Letters* (1986), 5:31-32.
Furfural, http://en.wikipedia/wiki/Furfural (Printed from Internet Jan. 10, 2013).
Haward, Physics of Glassy Polymers, Second Edition (May 1, 1973).
Jiang et al., Recycling Carbon Fibre/Epoxy Resin Composites Using Supercritical Propanol, 16$^{th}$ International Conference on Composite Materials (Jul. 8-13, 2007).
Li et al., A Promising Strategy for Chemical Recycling of Carbon Fiber /thermoset Composites: Self-accelerating Decomposition in a Mild Oxidative System, *The Royal Society of Chemistry* (2012), pp. 1-8.
Liu et al., Chemical recycling of carbon fibre reinforced epoxy resin composites in subcritical water: Synergistic effect of phenol and KOH on the decomposition efficiency, *Polym Degrad Stab* (2012), 97(3):7 (Abstract).
Reith et al., Lignocelulosic feedstock biorefinery for co-production of chemicals, transportation fuels, electricity and heat—IP BIOSYNERGY and beyond, Biorefinery Training Course (Jun. 12, 2009), pp. 1-24.
TransFurans Chemicals, Novel Furan Resins in Composite Applications (No date available).

* cited by examiner

*Primary Examiner* — Terressa Boykin
(74) *Attorney, Agent, or Firm* — Pepper Hamilton LLP

(57) ABSTRACT

Methods of extracting recycling carbon fibers are provided. Method of extracting and recycling carbon fibers with furan-2-carbaldehyde are provided and systems for performing the same are also provided. Compositions comprising resin composites, carbon fibers, and/or furan-2-carbaldehyde are also provided.

25 Claims, 1 Drawing Sheet

A.
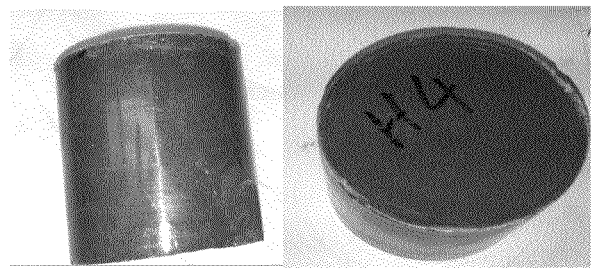
B.
C.

RECYCLING CARBON FIBERS FROM EPOXY USING SOLVENT CRACKING

CLAIM OF PRIORITY

This application is a U.S. national stage filing under 35 U.S.C. §371 of International Application No. PCT/US2012/047276 filed Jul. 19, 2012, entitled "RECYCLING CARBON FIBERS FROM EPDXY USING SOLVENT CRACKING," which is incorporated by reference in its entirety.

FIELD

Methods of recycling carbon fibers from epoxy using natural-based solvent cracking are provided.

BACKGROUND

Carbon fiber reinforced polymers (CFRPs) are increasingly used in consumer and enterprise applications. Effective and efficient recycling methods are needed, especially to reclaim the carbon fibers (CFs)—the most expensive component of CFRPs. Ideally the CFs are recovered intact and cleaned so they can be re-used in remanufacturing.

Therefore, there is a need to develop improved methods of recycling carbon fibers. The embodiments provided herein satisfy this need as well as others.

SUMMARY OF THE INVENTION

Embodiments provide methods of extracting carbon fibers from a resin composite. In some embodiments, the method comprises contacting a resin composite comprising carbon fibers with an extraction solvent to release the carbon fibers from the resin composite, wherein the extraction solvent comprises a cracking agent which is furan-2-carbaldehyde ("furfural"; CAS 98-01-1; $C_5H_4O_2$). In some embodiments, the extraction solvent further comprises one or more swelling agents. In some embodiments, the method comprises purifying the released carbon fibers to provide purified carbon fibers. In some embodiments, the extraction solvent further comprises at least one additional cracking agent in addition to furan-2-carbaldhye. In some embodiments, the method is performed under anhydrous conditions.

In some embodiments, the method is performed at about a neutral pH.

In some embodiments, the purifying step comprises filtering the released carbon fibers. In some embodiments, the purifying step comprises removing the cracked composite resin from the fibers.

In some embodiments, the method comprises drying the purified carbon fibers.

In some embodiments, the method comprises separating the extraction solvent from the released carbon fibers.

In some embodiments, the method comprises separating the extraction solvent from the released carbon fibers and the cracked composite resin. In some embodiments, the method comprises contacting the separated extraction solvent with a different resin composite to extract carbon fibers from the different resin composite.

Various embodiments provide systems for extracting carbon fibers from a resin composite. In some embodiments the system comprises a first container comprising a resin composite comprising carbon fibers; a second container comprising an extraction solvent, wherein the first container is operably connected to the second container such that the resin composite can be contacted with the extraction solvent, wherein the extraction solvent comprises a cracking agent, and wherein the cracking agent comprises furan-2-carbaldehyde.

In some embodiments, the system comprises a third container comprising one or more swelling agents, wherein the third container is operably connected to the first container such that the resin composite can be contacted with the one or more swelling agents. In some embodiments, the system comprises a purification system configured to purify the released carbon fibers. In some embodiments, the purification system comprises a filtration system.

In some embodiments, the system comprises an extraction solvent reservoir operably connected to the second container, wherein the extraction solvent can be added or removed from the second container. In some embodiments the extraction solvent further comprises at least one additional cracking agent in addition to furan-2-carbaldehyde.

In some embodiments, the system comprises a temperature regulating element to control the temperature of the extraction process.

In some embodiments, the system comprises a drying unit to dry the extracted fibers from the solvents.

In some embodiments, compositions comprising furan-2-carbaldehyde and a resin composite are provided. In some embodiments, the resin composite is an epoxy composite, polyester composite, polyamide composite, or a polyimide composite. In some embodiments, the composition comprises carbon fibers. In some embodiments, the composition comprises one or more swelling agents.

BRIEF DESCRIPTION OF DRAWINGS

FIGS. 1A-C show epoxies before and after treatment. FIG. 1A shows an epoxy prior to being treated. FIG. 1B shows an epoxy sample after being immersed partially in furfural for 8 hours at 50° C. FIG. 1C shows an epoxy sample after being partially immersed in furfural/DMSO for 8 hours at 50° C.

DETAILED DESCRIPTION

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail. Embodiments described herein can be combined with one another unless context dictates otherwise.

It must also be noted that as used herein and in the appended claims, the singular forms "a", "an", and "the" include plural reference unless the context clearly dictates otherwise.

As used in this document, terms "comprise," "have," and "include" and their conjugates, as used herein, mean "including but not limited to." While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Embodiments described herein provide methods of reclaiming valuable CFs utilizing stress cracking solvents. In some embodiments, the cracking solvents are based on furfural and its combination with several other swelling and stress cracking solvents including, but not limited to, dimethylformamide, dimethylsulphoxide, propylene carbonate, and the like. Furfural is derived from natural products, such as, corn cobs. Without wishing to be bound by any theory the phenomenon of solvent stress cracking is based on physical interaction of the furfural and its compositions based solvent with the epoxy composite matrix, leading to crystallization and cracking to fine powder. The CFs are, for example, liberated from the matrix with their structural and mechanical properties largely intact. The process takes place at very mild conditions with no environmental impact, which is advantageous and superior over prior methods.

Without being bound to any theory, a highly polar solvent or solvent composition is adsorbed/absorbed on the surface and then penetrates gradually into the epoxy composite matrix, which causes cracks in the epoxy composites. The epoxy composite undergoes cracking under the influence of the solvent stresses to provide a powder product. When used according to the embodiments described herein for the purpose of, but not limited to, recycling CFRPs, the CFs can be reclaimed intact. Additionally, the methods surprisingly can be performed under very mild conditions with little or no environmental impact. For example, the methods consume little energy. That is, little energy is required for the methods described herein to reclaim the carbon fibers compared to other methods. This is a marked advantage over thermal degradation, supercritical solvent techniques, or chemical decomposition at elevated temperatures and pressure, each of which require the application of external energy to drive the recycling of the CFs. Additionally, unlike thermal degradation, in some embodiments, the methods described herein produce little, if any, polluting decomposition products.

In some embodiments, the solvent that is used to recycle the CFs is furfural, the structure of which is shown below:

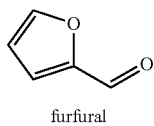

furfural

Furfural can be derived from natural materials including, but not limited to, corncobs, oats, wheat bran and sawdust. Thus, furfural is a sustainable reagent. The furfural can be produced by any one of numerous methods, which are well known in the art.

In some embodiments, the furfural is used alone to recycle the carbon fibers. In some embodiments, furfural is combined with other swelling and/or cracking solvents to recycle the carbon fibers. Examples of swelling agents include, but are not limited to, dimethyl sulphoxide, dimethylformamide and propylene carbonate.

The solvent can be used, for example, to recycle carbon fibers from common resins including, but not limited to, unsaturated polyesters, epoxy composites and their IPNs (interpenetrating polymer networks).

In addition to the advantages and surprising results described herein and that are readily apparent, the embodiments described herein also have the following unexpected advantages. The advantages include, but are not limited to, extremely low energy consumption, a simplified recycling process requiring fewer steps and does not require expensive or complicated equipment, and the furfural based solvent is derived from natural products making it a sustainable solvent. Other advantages include, but are not limited to, little, if any, contaminating or polluting by-products produced by the methods disclosed herein. An additional advantage is that the CFs are recycled largely intact, whereas, in prior methods, the CFs are degraded and make the process of recycling more difficult. Another advantage of the present embodiments is that the epoxy powder formed by the methods described herein is, for example, a highly active filler or starting material for other polymeric resins, composites or IPNs. In contrast, previous methods, such as thermal degradation, which is commonly used, leads to decomposed and oxidized degradation products, such as carbon dioxide, nitrogen dioxide, amines, and alcohols, which contaminate the remaining CFs and complicates recycling of the CFs. In contrast, the present embodiments do not produce such by-products. The present embodiments can be performed at lower temperatures and atmospheric pressures, whereas previous methods require increased temperatures and pressures. Another advantage is that the solvent that is used, furfural, can be recycled because the solvent is not changed through the process, but rather physically interacts with the recycled material. Therefore, the furfural can be recaptured and recycled and reused leading to a lower cost for continuing the recycling of carbon fibers. Therefore, the embodiments described herein have unexpected advantages that make the embodiments superior to previously disclosed methods of recycling carbon fibers.

Embodiments also provide methods of extracting carbon fibers from a resin composite. In some embodiments, the method comprises contacting resin composite comprising carbon fibers with a cracking solvent to release the carbon fibers from the resin composite. In some embodiments, the resin composite is immersed in the cracking solvent. In some embodiments, the cracking solvent comprises furan-2-carbaldehyde. In some embodiments, the cracking solvent comprises a swelling agent. In some embodiments, the cracking solvent comprises at least one other cracking agent in addition to furan-2-carbaldehyde. Examples of swelling agents or other cracking agents include, but are not limited to, with dimethylformamide, dimethylsulphoxide and propylene carbonate. The cracking agents and swelling agents can be used alone or in any combination with one another. In some embodiments, the resin composite is contacted with the vapor of the cracking solvent. Therefore, the resin composite can be immersed in the cracking solvent and/or exposed to the vapor of the cracking solvent Immersion can be complete immersion or partial immersion. The resin composite can also be wetted with the cracking solvent, such as by brushing the solvent on the resin composite. In some embodiments, the resin composite is partially submerged or fully submerged in the cracking solvent.

The resin composite can be any resin that can have carbon fibers recycled according to the methods described herein. In some embodiments, the resin is an epoxy composite, polyester composite, polyamide composite, or a polyimide composite, or any combination thereof. In some embodiments, the epoxy composite is bisphenol-A epoxy, Bisphenol-F epoxy, or Novolac epoxy (phenol formaldehyde resin).

In some embodiments, the resin composite is contacted with the cracking solvent at a temperature equal to or more than 50 degrees centigrade. In some embodiments, the temperature is about 50 to about 90, about 50 to about 80, about 50 to about 70, about 50 to about 60, about 60 to about 90, about 60 to about 80, about 60 to about 70, about 70 to about 80, about 70 to about 90, or about 80 to about 90 degrees centigrade. Specific examples of temperatures include about 50 degrees centigrade, about 60 degrees centigrade, about 70 degrees centigrade, about 80 degrees centigrade, about 90 degrees centigrade, and ranges between any two of these values.

In some embodiments, the resin composite is contacted with the cracking solvent under substantially anhydrous conditions or under anhydrous conditions. In some embodiments, the resin composite is contacted with the cracking solvent at about a neutral pH. In some embodiments, pH is about 6.5 to about 7.5, about 6.8 to about 7.2, or about 7.0.

In some embodiments, the resin composite is contacted with the cracking solvent for about 1, about 1-2, about 1-3, about 1-4, about 1-6, about 1-8, about 1-12, about 1-16, about 1-20, or about 1-24 hours.

In some embodiments, the method also comprises purifying the carbon fibers that are released from the resin from being contacted with the cracking solvent. Therefore, in some embodiments, the methods provide purified carbon fibers. In some embodiments, the purifying step comprises filtering the released carbon fibers. The filtering can be carried out by any method. The filtering can also be performed to remove the cracked composite resin from the recycled carbon fibers.

In some embodiments, the method comprises drying the purified carbon fibers. In some embodiments, drying comprises heating the purified carbon fibers. In some embodiments, the fibers are dried to remove at least, or about 10%, 20%, 30%, 40%, 50%, 60%, 70%, 80%, 90%, or 100% of the solvents or solutions remaining in the purified carbon fibers.

In some embodiments, the methods also comprise separating, recovering, or recycling the cracking solvent from the released carbon fibers and the cracked composite resin. The recycled cracking solvent may then be reused if desired. Thus, in some embodiments, a method is also provided that comprises contacting the separated extraction cracking solvent with a different resin composite to extract carbon fibers from the different resin composite. Accordingly, the cracking solvent is recycled and reused.

In some embodiments, the method comprises contacting the resin composite with a swelling solvent to, for example, delaminate the resin composite prior to contacting the resin composite with the cracking agent. In some embodiments, the resin composite is contacted with a swelling solvent after contacting the resin composite with the cracking agent.

In some embodiments, a system for extracting carbon fibers from a resin composite is provided. In some embodiments, the system comprises a first container that is operably connected to a second container. The first container can hold the resin composite that contains the carbon fibers to be recycled. The second container can hold the extraction solvent. The extraction solvent can contain one or more cracking agents and/or one or more swelling agents. The first container can be, for example, a tray that can hold the resin composite. In some embodiments, the first container can be operably connected to the second container such that the tray can be raised or lowered into the extraction solvent. In some embodiments, the first container is operably connected to the second container such that vapors emitted by the second container comprising the extraction solvent contact the first container comprising the epoxy resin. In some embodiments, the containers are rotated so that the solvent is mixed with the epoxy resin. In some embodiments, the first container is operably connected to the second container such that the first container can be immersed in the extraction solvent. In some embodiments, the containers are operably connected to a reservoir. In some embodiments, after the carbon fibers are released by the extraction solvent, the released fibers are purified away from the solvent. This can be done, for example, by allowing the carbon fibers and the solvent to flow into the reservoir. The fibers can be purified and/or isolated from the reservoir by standard methods including, but not limited to, filtration and the like. The extraction solvent can then be reused to recycle additional carbon fibers from the epoxy resin previously treated or from a different epoxy resin.

In some embodiments, the second container comprises a filtration system such that the carbon fibers can be isolated away from the extraction solvent. The extraction solvent can be recycled and reused to extract or release additional carbon fibers. In some embodiments, the containers are operably connected through a system of inlets and outlets and tubing. The method of connection, however, can be any method to allow the purification of the recycled carbon fibers.

In some embodiments, the system comprises the extraction solvent, wherein the extraction solvent comprises one or more cracking agents and one or more swelling agents. The one or more cracking agents and/or one more swelling agents can be any agent as described herein.

In some embodiments, the system comprises at least one temperature regulating element to control the temperature of the cracking process of the resin. The temperature regulating element can control the temperature of the extraction solvent. In some embodiments, the system is operated at a temperature that produces extraction solvent vapors. The vapors can then be allowed to contact the epoxy resin to allow the carbon fibers to be released and recycled. In some embodiments, the temperature regulating element is configured to maintain the system at a temperature equal to or more than 50 degrees centigrade. In some embodiments, the temperature regulating element is configured to maintain the system at a temperature of about 50 to about 90, about 50 to about 80, about 50 to about 70, about 50 to about 60, about 60 to about 90, about 60 to about 80, about 60 to about 70, about 70 to about 80, about 70 to about 90, or about 80 to about 90 degrees centigrade. Specific examples of temperatures include about 50 degrees centigrade, about 60 degrees centigrade, about 70 degrees centigrade, about 80 degrees centigrade, about 90 degrees centigrade, and ranges between any two of these values.

In some embodiments, the system comprises at least one drying unit. The drying unit can be used, for example, to dry the extracted fibers from the solvents. In some embodiments, the drying unit is configured to remove at least, or about, 10, 20, 30, 40, 50, 60, 70, 80, 90 or 100% of the solvents present with the recycled carbon fibers.

In some embodiments, the system comprises a third container. The third container can be operably connected to the second container. In some embodiments, the third container comprises a swelling agent. The third container can be operably connected to the second container such that the swelling agent can be introduced into the second container. This configuration can be used to expose the epoxy resin to an extraction solvent comprising both a cracking agent and a swelling agent. In some embodiments, the swelling agent is added directly to the second container.

Embodiments also provide compositions comprising an extraction solvent furan-2-carbaldehyde and a resin composite. In some embodiments, the resin composite is an epoxy composite, polyester composite, polyamide composite, or a polyimide composite. In some embodiments, the composition comprises carbon fibers. The carbon fibers can be carbon fibers released from the resin composite. In some embodiments the composition also comprises one or more additional cracking agents that is not furan-2-carbaldehyde. In some embodiments, the composition comprises one or more swelling agents.

EXAMPLES

Example 1

Use of Furfural to Recycle Carbon Fibers

Cylindrical samples 48 mm diameter×50 mm high were made from Novolac epoxy resin cured with isophoronediamine consisting of reinforcing fibers. The samples were post cured at 100° C. for 16 hours and then cooled to room temperature. Samples were immersed to their ⅓ height in furfural in a closed container. After 24 hours at room temperature, the immersed part of the samples were highly eroded and the upper part subjected to the vapors only was highly swollen and expanded, which is shown in FIG. 1.

Example 2

Use of Furfural Mixtures to Recycle Carbon Fibers

Samples from reinforced epoxy composite as described in Example 1 were immersed in mixtures of furfural and DMF, furfural/DMSO, furfural/propylene carbonate (ratios of 1:1, 1:2, 1:3). The qualitative results showed that the samples underwent higher swelling rate but a lower cracking rate were observed.

Example 3

Increasing Temperature Increases Cracking and Recycling

The methods described in Examples 1 and 2 were performed at different temperatures, such as 30, 40, 50, 60, 70, 80, 90, or 100° C. The qualitative results showed that swelling and cracking rates increased with increasing temperature. It is expected that carrying out these cracking experiments under pressure will significantly increase the cracking rate and reduce time needed the reclaiming process.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method of extracting carbon fibers from a resin composite, the method comprising:
   contacting a resin composite comprising carbon fibers with an extraction solvent to release the carbon fibers from the resin composite, wherein the extraction solvent comprises a cracking agent which is furan-2-carbaldehyde.

2. The method of claim 1 further comprises contacting with one or more swelling agents.

3. The method of claim 2, wherein contacting with one or more swelling agents comprises contacting with dimethylformamide, dimethylsulphoxide, propylene carbonate, or any combination thereof.

4. The method of claim 1, wherein contacting comprises immersing the resin composite in the extraction solvent or exposing the resin composite to vapors of the extraction solvent.

5. The method of claim 1, further comprising purifying the released carbon fibers to provide purified carbon fibers.

6. The method of claim 1, further comprises adding at least one additional cracking agent in addition to furan-2-carbaldehdye.

7. The method of claim 1, wherein contacting the resin composite with the extraction solvent comprises contacting an epoxy composite, a polyester composite, a polyamide composite, or a polyimide composite with the extraction solvent.

8. The method of claim 7, wherein the epoxy composite is bisphenol-A epoxy, Bisphenol-F epoxy, or Novolac epoxy.

9. The method of claim 1, wherein contacting step is performed at a temperature of about 50 degrees centigrade to about 90 degrees centigrade.

10. The method of claim 1, wherein contacting is performed under anhydrous conditions or at a neutral pH.

11. The method of claim 5, wherein the purifying step comprises filtering the released carbon fibers or removing the cracked composite resin from the fibers.

12. The method of claim 1, further comprising separating the extraction solvent from the released carbon fibers.

13. The method of claim 12, further comprising contacting the separated extraction solvent with a different resin composite to extract carbon fibers from the different resin composite.

14. A system for extracting carbon fibers from a resin composite, the system comprising:
   a first container comprising a resin composite comprising carbon fibers;
   a second container comprising an extraction solvent, wherein the first container is operably connected to the second container such that the resin composite can be contacted with the extraction solvent,
   wherein the extraction solvent comprises a cracking agent, wherein the cracking agent comprises furan-2-carbalderhyde.

15. The system of claim 14, further comprising a third container comprising one or more swelling agents, wherein the third container is operably connected to the first container such that the resin composite can be contacted with the one or more swelling agents.

16. The system of claim 14, further comprising a purification system configured to purify the released carbon fibers.

17. The system of claim 14, further comprising a temperature regulating element to control the temperature of the extraction process.

18. The system of claim 14, further comprising a drying unit to dry the extracted fibers from the solvents.

19. A method of degrading an epoxy resin, the method comprising contacting the epoxy resin with a degradation solvent comprising furan-2-carbaldehyde.

20. The method of claim 19, whereby the degradation solvent cracks the epoxy resin.

21. The method of claim 19, wherein the contacting step produces powdered epoxy.

22. A method of extracting carbon fibers from a resin composite, the method comprising:
   contacting a resin composite comprising carbon fibers with furan-2-carbaldehyde at a temperature of about 50 degrees centigrade to about 90 degrees centigrade to crack the resin and release the carbon fibers from the resin composite; and
   and purifying the released carbon fibers from the resin composite.

23. The method of claim 22, wherein contacting with one or more swelling agents comprises contacting with dimethylformamide, dimethylsulphoxide, propylene carbonate, or any combination thereof.

24. The method of claim 22, wherein contacting the resin composite with the extraction solvent comprises contacting an epoxy composite, a polyester composite, a polyamide composite, or a polyimide composite with the extraction solvent.

25. The method of claim 22, wherein contacting is performed under anhydrous conditions or at a neutral pH.

* * * * *

UNITED STATES PATENT AND TRADEMARK OFFICE
CERTIFICATE OF CORRECTION

Page 1 of 1

| | |
|---|---|
| PATENT NO. | : 8,920,932 B2 |
| APPLICATION NO. | : 13/814844 |
| DATED | : December 30, 2014 |
| INVENTOR(S) | : Adam |

It is certified that error appears in the above-identified patent and that said Letters Patent is hereby corrected as shown below:

On the Title Page, in Item (56), under "OTHER PUBLICATIONS", in Column 2, line 24, delete "Lignocelulosic" and insert -- Lignocellulosic --, therefor.

In the Specification

In Column 1, Line 9, delete "EPDXY" and insert -- EPOXY --, therefor.

In Column 2, Lines 2-3, delete "furan-2-carbalderhyde." and insert
-- furan-2-carbaldehyde. --, therefor.

In Column 4, Line 50, delete "solvent" and insert -- solvent. --, therefor.

In the Claims

In Column 8, Lines 38-39, in Claim 14, delete "furan-2-carbalderhyde." and insert
-- furan-2-carbaldehyde. --, therefor.

In Column 8, Line 66, in Claim 22, delete "and purifying" and insert -- purifying --, therefor.

Signed and Sealed this
Thirtieth Day of June, 2015

Michelle K. Lee
*Director of the United States Patent and Trademark Office*